United States Patent
Baret et al.

(10) Patent No.: US 9,398,097 B2
(45) Date of Patent: Jul. 19, 2016

(54) METHOD FOR SERVICING A FIELD DEVICE

(75) Inventors: Marc Baret, Kembs (FR); Eric Birgel, Schopfheim (DE); Julien Fischer, Saint Louis (FR); Martine Lefebvre, Blotzheim (FR); Andrea Seger, Zell (DE); Mathieu Weibel, Saint Louis (FR)

(73) Assignee: ENDRESS + HAUSER GMBH + CO. KG, Maulburg (DE)

( * ) Notice: Subject to any disclaimer, the term of this patent is extended or adjusted under 35 U.S.C. 154(b) by 335 days.

(21) Appl. No.: 13/598,803

(22) Filed: Aug. 30, 2012

(65) Prior Publication Data

US 2013/0054765 A1 Feb. 28, 2013

Related U.S. Application Data

(60) Provisional application No. 61/528,837, filed on Aug. 30, 2011.

(30) Foreign Application Priority Data

Aug. 30, 2011 (DE) .......................... 10 2011 081 796

(51) Int. Cl.
  G06F 15/177 (2006.01)
  H04L 29/08 (2006.01)
  G05B 19/042 (2006.01)

(52) U.S. Cl.
  CPC ............ H04L 67/12 (2013.01); G05B 19/0423 (2013.01); *G05B 2219/25428* (2013.01)

(58) Field of Classification Search
  USPC ........................................................ 709/220
  See application file for complete search history.

(56) References Cited

U.S. PATENT DOCUMENTS

| | | | | |
|---|---|---|---|---|
| 7,702,774 | B2 * | 4/2010 | Birkhofer et al. | 709/223 |
| 8,250,174 | B2 * | 8/2012 | Von Stein et al. | 709/218 |
| 8,306,658 | B2 * | 11/2012 | Kilian | 700/247 |
| 2005/0021597 | A1 * | 1/2005 | Derasmo et al. | 709/201 |

FOREIGN PATENT DOCUMENTS

| | | |
|---|---|---|
| DE | 10 2007 026 602 A1 | 11/2008 |
| DE | 10 2007 047 061 A1 | 4/2009 |
| WO | 2007/077189 A1 | 7/2007 |
| WO | 2009/074544 A1 | 6/2009 |

OTHER PUBLICATIONS

English translation of WO 2009074544.*
Urs Schappi, Das Hart Protokoll, Berner Fachhochschule, Hochschule fur Technik und Informatik HTI, Dec. 2005 at Burgdorf, Germany.
Search Report in PCT/EP2012/065957, dated Feb. 7, 2013.
English translation of the IPR, WIPO, Geneva, Switzerland, Mar. 13, 2014.

* cited by examiner

*Primary Examiner* — Tu Nguyen
(74) *Attorney, Agent, or Firm* — Bacon & Thomas, PLLC

(57) ABSTRACT

A method for servicing a field device of process automation technology. The data exchanged between the field device and a servicing program is by means of at least one protocol, which has basic commands, via which basic functions of the field device can be invoked. Each field device which is compatible with the protocol has these basic functions available to it, and wherein only basic commands of the protocol are used to transfer data between the servicing program and the field device.

16 Claims, 1 Drawing Sheet

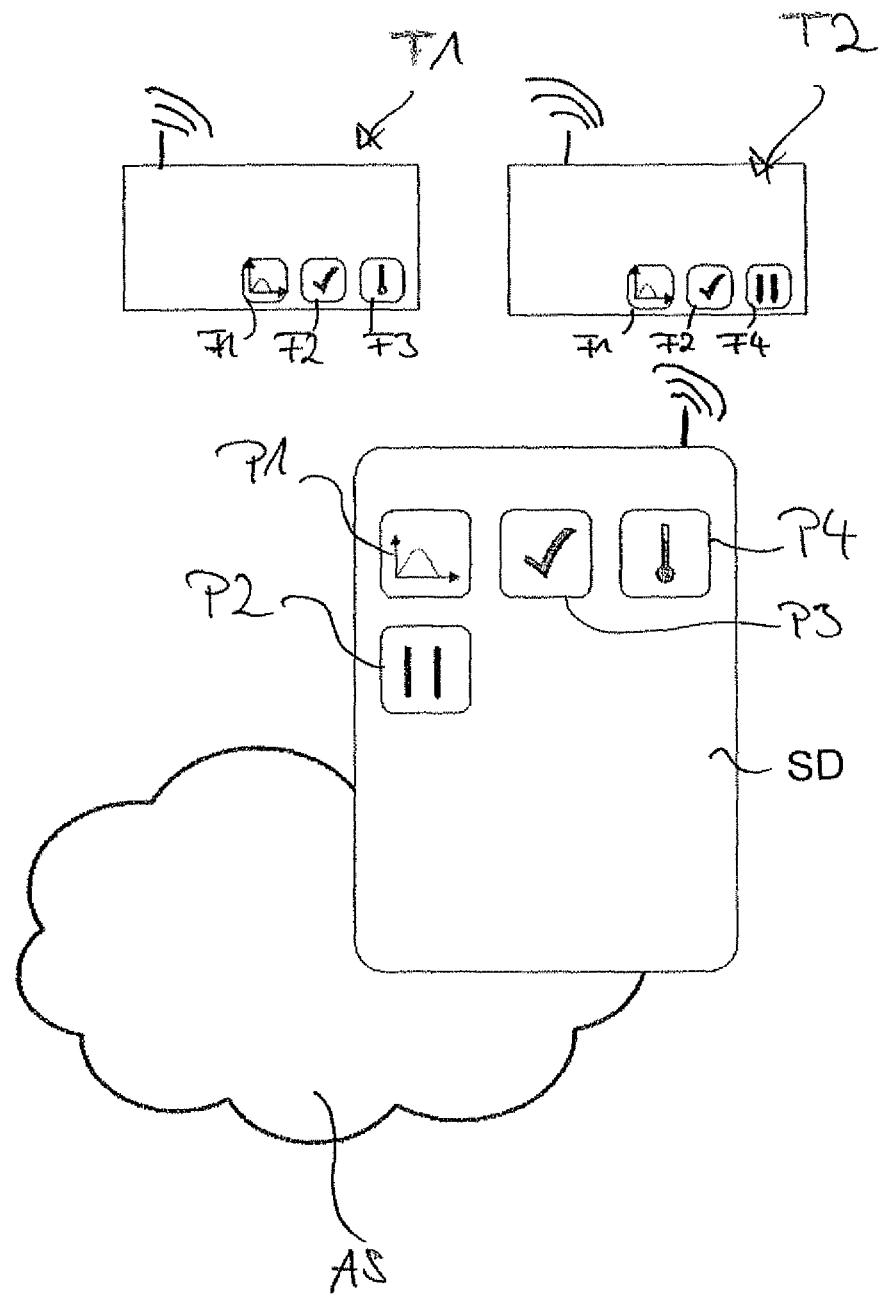

METHOD FOR SERVICING A FIELD DEVICE

CROSS-REFERENCE TO RELATED APPLICATION

This application is a Nonprovisional Application, which claims the benefit of U.S. Provisional Application 61/528, 837, which was filed on Aug. 30, 2011.

TECHNICAL FIELD

The invention relates to a method for servicing a field device of process automation technology, wherein data are exchanged between the field device and a servicing program by means of at least one protocol, wherein the protocol has basic commands, via which basic functions of the field device can be invoked, and wherein each field device compatible with the protocol has these basic functions available to it.

BACKGROUND DISCUSSION

Furthermore, the invention relates to a field device and a servicing device for performing the method, as well as to a computer program product.

Known from the state of the art are methods, by means of which a field device can be serviced, for example, based on a device description (abbreviated DD). The device description describes the device functionalities of a field device. Via the device description, particular commands available in a protocol can be linked with particular functionalities of a field device. The commands which can be used therefor are predetermined by the basic protocol, which the field device understands, in order, for example, to be able to communicate via a fieldbus to which it is connected.

Such methods are executed, for example, in the form of programs. By means of these programs, a user can transmit data to the field device or obtain data from the field device, data which serve for controlling the plant, the processes running therein or the field device itself. The data are, in such case, transmitted between the program and the field device. The transmission path is, for example, a wired, or wireless, fieldbus. The aforementioned programs can be, for example, one of the programs AMS, POM, Fieldcare, FieldXpert or FieldCommunicator.

Field devices used in process and automation technology can communicate, for example, according to the HART protocol, the Profibus or the FOUNDATION Fieldbus protocol. These protocols have different types of commands. For one, there are the basic commands, which each field device compatible with the corresponding fieldbus protocol must have available.

There furthermore exists a group of commands, which are referred to as "common practice commands" and upon which the various manufacturers have agreed. For example, field devices of a specific type, for example, flow measuring devices, have available a certain number of "common practice commands".

There exist, moreover, so-called "device specific commands" by means of which special functions of a particular field device can be invoked. These commands are predetermined by the manufacturer of a field device specifically for such field device and/or its purpose of use. A control unit for an industrial plant must know these commands, in order to assure the operation of the plant and/or in order to be able to completely configure the field devices to the predetermined requirements. Attention must especially be paid in such case that the same command is not assigned multiple times and triggers different functions in different field devices.

Given that these different servicing programs are available, it is known from the state of the art also to create a unique driver, i.e. a unique device description, for each.

SUMMARY OF THE INVENTION

An object of the invention is to provide for a simple, universal servicing of field devices.

The object is achieved by a method, a field device, a servicing device and a computer program product.

As regards the method, the object is achieved by features including that only basic commands of the protocol are used to transfer data between the servicing program and the field device.

Especially, the servicing program can utilize only one or two basic commands to retrieve data from the field device. These basic commands can then serve not only for retrieval of certain process relevant data from one field device, but, instead, also from a plurality of field devices. Moreover, such a method can be used not only in the case of a field device with a certain control unit, such as, for example, AMS. Via the proposed invention, it is also possible to access field devices independently of the host system used, and to retrieve data from one field device or from a plurality of field devices.

Via the proposed invention, also field devices of different types, such as, for example, different flow measuring devices, can be serviced in a plant, without a specific driver being required in each case. In such case, an idea of the present invention is to no longer use device specific drivers, but, instead, to provide servicing programs for particular applications for uniformly servicing the different field devices in these applications.

The proposed servicing program can be, for example, a program that displays graphs of curves, retrieves diagnostic information from the field device, calculates and/or displays measured values, creates statistics, establishes a SIL mode, etc.

For this purpose, the servicing device and the field device preferably each has a corresponding communication interface, via which data are transmittable according to a protocol, which both devices support. Via its interface, the field device can report to the servicing device (or the servicing device to the field device), which functions or servicing program are/is supported. By means of a servicing program, the corresponding values can then be queried from the field device and, preferably, also presented on the servicing device.

If a function supported by a servicing program is not present in the field device, the user can be informed thereof via a corresponding report.

By means of a servicing program, also a predictive maintenance of the field device or the plant can occur. Via another servicing program, a number of field devices can be synchronized with one another. A further servicing program can, for example, query the field device for the configuration present in the field device, which is given, for example, by a parametering of the field device, and can compare this with a configuration stored, for example, in the servicing device. Therewith, the configuration present in the field device can be checked and/or changed, and, especially, updated. For each of the above-mentioned applications, a single servicing program is preferably responsible, which is loaded by a user into the servicing device and is executable there.

In a form of embodiment of the method, the protocol furthermore includes supplemental commands, via which specific supplemental functions of a respective field device type can be invoked, wherein these specific supplemental functions depend on the field device type, to which the field device belongs.

In an additional form of embodiment of the method, data are transmitted between the field device and the servicing program without a device description file being used, wherein the device description file defines by means of which of the available supplemental commands of the used protocol the supplemental functions of the field device are invokable. The supplemental commands can be, for example, so-called "common practice commands" or "device-specific commands", whose functions are freely definable within the protocol, while, in contrast, the functions of the basic commands are predetermined by the choice of the protocol.

In an additional form of embodiment of the method, basic commands are placed in the servicing program in a predetermined sequence, in which sequence the basic commands are transmitted to the field device. For example, first of all, the field device ID can be queried by means of a first basic command, and then, for example, measured values of the field device are retrieved by means of a second basic command. Analogously, other functions of the field device, which are retrievable by means of the servicing program, can be invoked.

In an additional form of embodiment of the method, from the data queried by means of the basic commands of the protocol, which data especially involves a device ID and/or measured values of the field device, a display is created on a display unit of the service device, which gives, for example, a measured value, a measured value graph, a value derived therefrom or a state of the field device.

In an additional form of embodiment of the method, by means of the servicing program, data of the field device are presented, wherein these data are retrievable from the field device via a single basic command, or, at most, two, at absolute most three basic commands.

In an additional form of embodiment of the method, the servicing program serves for representation of data retrievable from a plurality of field devices by means of a single basic command.

In an additional form of embodiment of the method, in each case by means of one servicing program, data from a plurality of field devices are presented, wherein these data are downloaded from the respective field devices by means of a single basic command, wherein the field devices are preferably connected with one another via a fieldbus.

In an additional form of embodiment of the method, a configuration of the field device, which configuration is present in the field device and transferred to the servicing program, is compared by means of the servicing program with a reference configuration of the field device, which is present in the servicing program, wherein, in the case of a configuration of the field device differing from the reference configuration, the reference configuration is transmitted to the field device.

In an additional form of embodiment of the method, the servicing program runs on a handheld servicing device, which preferably has an Internet connection.

In an additional form of embodiment of the method, the servicing program is transmitted via the Internet from a server into a memory of the service device.

In an additional form of embodiment of the method, a number of servicing programs are made available on the server, in order to service the field device, wherein different service functions are made available via the servicing programs.

In an additional form of embodiment of the method, the field device includes a communication interface, especially a wireless communication interface, wherein data are transmitted between the field device and the servicing device.

The object is achieved as regards the field device by a field device suitable for performing the method according to one of the aforementioned forms of embodiment, with a communication interface, especially a wireless communication interface.

As regards the service unit, the object is achieved by the features of a servicing device with a servicing program for performing the method according to one of the aforementioned forms of embodiment.

As regards of the computer program product, the object is achieved by a computer program product having a computer readable memory, wherein in this memory, program code means are stored, which, when they are executed by a computer system, execute the method according to one of the preceding forms of embodiment.

BRIEF DESCRIPTION OF THE DRAWING

The invention will now be explained in greater detail based on the appended drawing, the sole FIGURE of which shows as follows:

FIG. 1 is a schematic representation of an application of the proposed invention.

DETAILED DESCRIPTION IN CONJUNCTION WITH THE DRAWING

FIG. 1 shows first and second field devices T1, T2, which have available field device specific functions F1-F4. The field devices T1, T2 can, as shown in FIG. 1, each utilize a wireless communication interface. Other options, however, include a cable communication interface. Via their communication interfaces, field devices T1, T2 can be connected with one another and/or with a superordinated unit (not shown), as well as also with a servicing device SD.

Via the servicing device SD, which preferably has a display unit, the one or more servicing programs P1-P4 can be displayed and/or invoked. Thus, especially, data can be displayed from a field device T1, T2, which does not have its own display unit available. Thus, by way of example, the field devices T1, T2 shown in FIG. 1 do not have their own display unit available on the field device.

Furthermore, the servicing device SD, which is, for example, a smart phone, can be connected via a communication connection—such as, for example, the Internet—with a server AS, from which the servicing programs P1-P4 can be loaded into the servicing device SD. In the server and/or servicing device SD, a number of different servicing programs P1-P4 can be stored, so that a user can, according to need, invoke one or more of servicing programs P1-P4. For these servicing programs P1-P4, a fee can be imposed by the vendor of the programs.

Thus, the field device T1, has, for example, functions F1, F2, F3 shown via the thumbnails, thus, the graphing function F1, the device diagnosis function F2 and the temperature measured value determination function F3. The field device T2 has the graphing function F1, the diagnostic function F2 and a flow determination function F4. The servicing device SD shown in FIG. 1 includes corresponding servicing programs P1-P4, which in each case supports one—especially preferably exactly one—of the functions F1, F2, F3, respectively F1, F2, F4, present in the field devices T1, T2. In the illustrated servicing device SD, servicing programs P1-P4 are present for showing a graph, for instance a plot of a curve, P1, for diagnosis P3, for temperature measured value display P4 and for flow measured value display P2.

Via use of basic commands, a relatively unspecific servicing device SD—such as, for example, a smart phone—can now be used for servicing field devices T1, T2. A device description and a corresponding device description file are not provided for servicing a field device T1, T2 by means of service device SD.

The invention claimed is:

1. A method for servicing a field device of process automation technology, with a servicing program, comprising the steps of:
    exchanging data between the field device and said servicing program, using at least one protocol, which has basic commands;
    invoking, via the basic commands, basic functions of the protocol, wherein each field device compatible with the protocol has these basic functions available to it; and
    using only basic commands of the protocol to transfer data between the servicing program and the field device.
2. The method as claimed in claim 1, wherein:
    the protocol furthermore includes supplemental commands, via which specific supplemental functions of a particular field device type can be invoked; and
    these specific supplemental functions depend on field device type, to which the field device belongs.
3. The method as claimed in claim 1, wherein:
    data are transmitted between the field device and the servicing program without a device description file being used; and
    the device description file defines by means of the available supplemental commands of the used protocol the supplemental functions of the field device which are invokable.
4. The method as claimed in claim 1, further comprising the steps of:
    placing in the servicing program in a predetermined sequence, in which sequence the basic commands are transmitted to the field device.
5. The method as claimed in claim 1, wherein:
    from data queried by means of the basic commands of the protocol, which data especially involves a device ID and/or measured values of the field device, a display is created on a display unit of the service device, which gives, a measured value, a measured value graph, a value derived therefrom or a state of the field device.
6. The method as claimed in claim 1, wherein:
    by means of the servicing program, data of the field device are presented; and
    these data are retrievable from the field device via a single basic command, or, at most, two basic commands.
7. The method as claimed in claim 6, wherein:
    the servicing program serves for representation of data retrievable from a plurality of field devices by means of a single basic command.
8. The method as claimed in claim 1, wherein:
    in each case by means of one servicing program, data from a plurality of field devices are presented;
    this data are downloaded from the respective field devices by means of a single basic command; and
    the field devices are preferably connected via a fieldbus with one another.
9. The method as claimed in claim 1, wherein:
    a configuration of the field device, which configuration is present in the field device and transmitted to the servicing program, is compared by means of the servicing program with a reference configuration of the field device, which is present in the servicing program, and,
    in the case of a configuration of the field device differing from the reference configuration, the reference configuration is transmitted to the field device.
10. The method as claimed in claim 1, wherein:
    the servicing program is run on a handheld servicing device, which has an Internet connection.
11. The method as claimed in claim 10, wherein:
    the servicing program is transmitted via Internet from a server into a memory of the service device.
12. The method as claimed in claim 11, wherein:
    a number of servicing programs made are made available on the server, in order to service the field device; and
    different service functions are made available via the servicing programs.
13. The method as claimed in claim 12, wherein:
    the field device includes a communication interface, especially a wireless communication interface, wherein data are transmitted between the field device and the servicing device.
14. A field device, with a communication interface, especially a wireless communication interface for performing the method comprising the steps of:
    exchanging data between the field device and said servicing program, using at least one protocol, which has basic commands;
    invoking, via the basic commands, basic functions of the protocol, wherein each field device compatible with the protocol has these basic functions available to it; and
    using only basic commands of the protocol to transfer data between the servicing program and the field device.
15. A servicing device with a servicing program for performing the method comprising the steps of:
    exchanging data between the field device and said servicing program, using at least one protocol, which has basic commands;
    invoking, via the basic commands, basic functions of the protocol, wherein each field device compatible with the protocol has these basic functions available to it; and
    using only basic commands of the protocol to transfer data between the servicing program and the field device.
16. A computer program product with a non-transitory computer readable medium in which program code means are stored, which, when they are executed by a computer system, execute the method comprising the steps of:
    exchanging data between the field device and said servicing program, using at least one protocol, which has basic commands;
    invoking, via the basic commands, basic functions of the protocol, wherein each field device compatible with the protocol has these basic functions available to it; and
    using only basic commands of the protocol to transfer data between the servicing program and the field device.

* * * * *